(No Model.)

E. P. NEWBANKS & J. MAHAFFA.
FEED TROUGH.

No. 382,721. Patented May 15, 1888.

Witnesses.
M. A. Barnes.
Van Buren Hillyard.

Inventor:
Eli P. Newbanks,
John Mahaffa.
By R. S. & A. P. Lacey.
Attys.

(No Model.)
E. P. NEWBANKS & J. MAHAFFA.
FEED TROUGH.
No. 382,721.        Patented May 15, 1888.
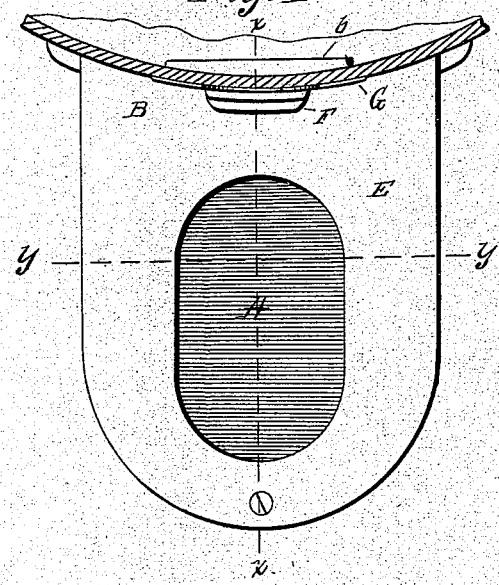
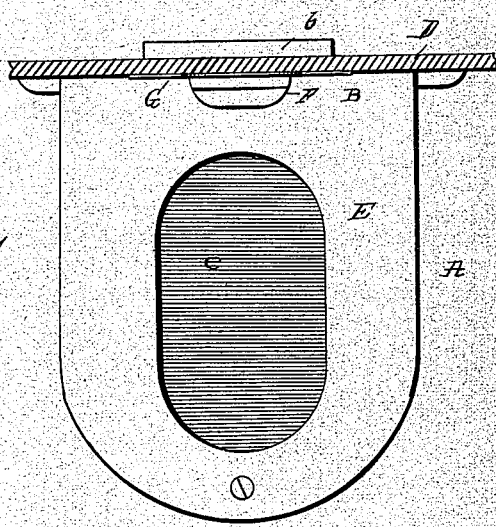
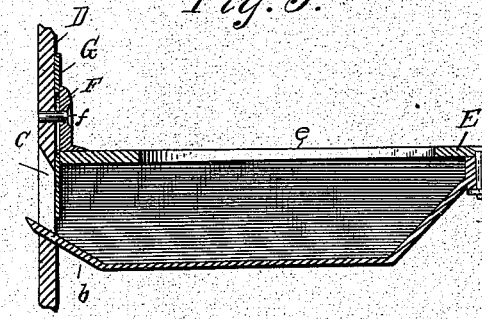
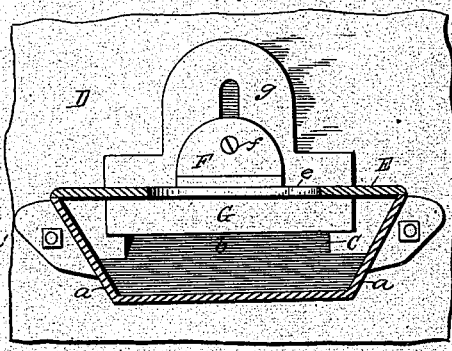
Witnesses.
M. A. Barnes.
Van Buren Hillyard.
Inventor:
Eli P. Newbanks,
John Mahaffa.
By R. S. & A. P. Lacey.
Attys.

UNITED STATES PATENT OFFICE.

ELI P. NEWBANKS AND JOHN MAHAFFA, OF BELOIT, KANSAS.

FEED-TROUGH.

SPECIFICATION forming part of Letters Patent No. 382,721, dated May 15, 1888.

Application filed December 20, 1887. Serial No. 258,472. (No model.)

*To all whom it may concern:*

Be it known that we, ELI P. NEWBANKS and JOHN MAHAFFA, citizens of the United States, residing at Beloit, in the county of Mitchell and State of Kansas, have invented certain new and useful Improvements in Feed-Troughs; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to feed-trough attachments for barrels, cribs, &c., where the feed is held in bulk, and is designed to permit but a limited amount of feed to be exposed at any one time.

The object of the invention is the production of a device which can be readily applied to any kind of receptacle for automatically meeting out the feed to poultry and stock proportionately as the feed is consumed, whereby a given amount of feed will remain standing.

The device is simple and prevents the wasting of feed, and is provided with an adjustable cut-off for regulating the quantity of feed to be left in the trough.

The improvement consists of a shallow trough having flaring sides and an open end, from which an inclined chute extends to enter an opening in the side of the box or crib to which the attachment is to be applied. The end of the trough is provided with ears, by which it is secured to the box, and the trough is closed by a top having an oblong opening therein for the stock or poultry to feed through. The opening in the box or crib is closed by a cut-off which is adjustable to regulate the size of opening.

The improvement further consists in the details of construction and combination of parts, which will be more fully hereinafter set forth and claimed, and shown in the annexed drawings, in which—

Figure 1:
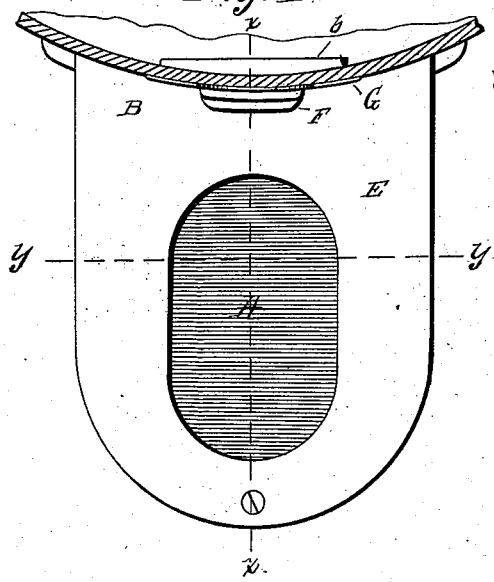
Figure 2:
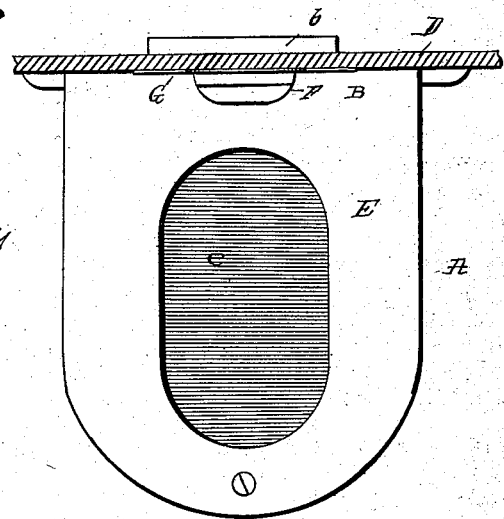
Figure 3:
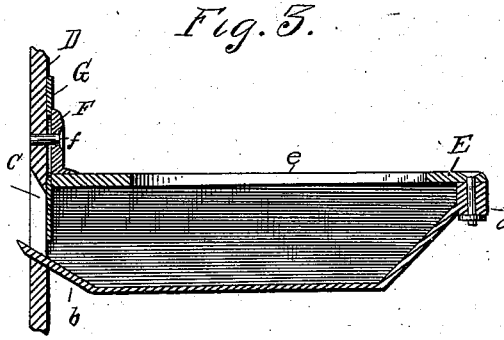
Figure 4:
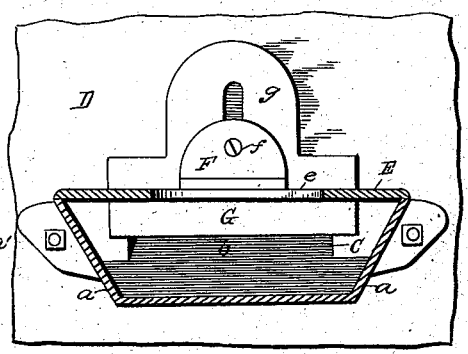

Figure 1 is a plan view of a feed-trough attachment of our invention, showing it applied to the side of a barrel; Fig. 2, a view similar to Fig. 1, but showing the attachment applied to a box or crib; Fig. 3, a longitudinal section on the line X X of Fig. 1, and Fig. 4 a cross-section on the line Y Y of Fig. 1.

The shallow trough A, having flaring sides $a$, is open at the end B, which has the inclined chute $b$ projecting upward from its bottom to extend across the opening C in the side of the box or crib, as D, to which the device may be applied. This end B may be straight or curved, according to the form of the box for which it is designed, and is provided with lugs or ends for securing the trough to the said box. The top B, having the oblong opening $e$ therein, is secured to the trough at its outer end by a bolt passing through it and the extension $a'$ at the outer end of the trough. The inner end of the top having the ear F is fastened to the box by a bolt, $f$, passing through the ear F. The cut-off G, located between the end of the top E and the side of the box, and having the extension $g$, which is slotted, is secured against accidental displacement by the bolt $f$, which extends through the slot of the extension $g$. By loosening bolt $f$ the cut-off can be moved up or down, and when the cut-off is adjusted it is held from further movement by tightening bolt $f$.

For cheapness of construction the trough and top are made separate; but sometimes they are cast in one. The chute $b$ prevents the feed lodging on the lower edge of the opening in the box, and gives direction to the feed and prevents the feed falling out between the trough and the box. These attachments will be made of various sizes, and as many as desired may be applied to a box or crib.

Having thus described our invention, what we claim, and desire to secure by Letters Patent, is—

1. The herein-described trough attachment for cribs, boxes, &c., having an open end, and provided with an inclined chute that projects from said end to enter an opening in the side of the crib or box to which the device may be applied, substantially as specified.

2. The combination, with the shallow trough having one end open and provided with an inclined chute, of the top having a feed-opening, the ear extending from the rear end of the top, and the cut-off adapted to be held in place by the bolt passing through the ear, substantially as described.

3. The herein shown and described attachment, composed of the shallow trough open at one end and having flaring sides and provided with ears, and an inclined chute at the open end, the top provided with a feed-opening and having an ear at its rear end, and the cut-off having a slotted extension, substantially as and for the purpose described.

4. The combination, with the box or crib having an opening in its side, of the trough having an open end, which end is secured to the side of the crib or box, and is provided with an inclined chute that extends through the said opening into the box or crib, substantially as described.

5. The combination, with the box or crib having an opening in its side, and the trough having an open end and provided with an inclined chute that extends through the said opening, and with the lug F, of the slotted cut-off placed between the box or crib and the trough, and the bolt $f$, for securing the trough to the box and for holding the cut-off in an adjusted position, substantially as specified.

In testimony whereof we affix our signatures in presence of two witnesses.

ELI P. NEWBANKS.
JOHN MAHAFFA.

Witnesses:
A. G. MEAD,
E. L. HALL.